United States Patent

[11] 3,530,844

| [72] | Inventor | Mitsuji Kawai<br>26, 1-chome, Kaname-cho, Toshima-ku,<br>Tokyo, Japan |
|---|---|---|
| [21] | Appl. No. | 779,094 |
| [22] | Filed | Nov. 26, 1968 |
| [45] | Patented | Sept. 29, 1970 |
| [32] | Priority | Jan. 8, 1968 |
| [33] | | Japan |
| [31] | | 43/760 |

[54] DEVICE ADAPTED TO BE EMPLOYED IN CONJUNCTION WITH THE CARBURETOR IN AN INTERNAL COMBUSTION ENGINE
10 Claims, 6 Drawing Figs.

[52] U.S. Cl. .................................................. 123/122,
261/79, 261/145
[51] Int. Cl. ..................................................... F02m 31/08
[50] Field of Search ........................................... 123/122A,
122A1, 122A2, 122A3; 261/145, 152, 153

[56] References Cited
UNITED STATES PATENTS

| 1,431,281 | 10/1922 | Benjamin | 123/122 |
| 1,476,281 | 12/1923 | Brewer | 123/122 |
| 1,678,327 | 6/1928 | Carlston | 123/122 |
| 1,734,723 | 11/1929 | Gildehaus | 123/122 |

Primary Examiner—Carlton R. Croyle
Assistant Examiner—Ronald B. Cox
Attorney—Holman and Stern ABSTRACT: A device adapted to be employed in conjunction with the carburetor in an internal combustion engine in order to heat and reduce the pressure on a flow of mixture of gasoline and air from said carburetor as the mixture is moving from the carburetor toward the cylinder of said internal combustion engine whereby the vaporization of the mixture is further augmented to the extent suitable to be perfectly burned in the engine and the amount of hydrocarbon to be contained in the exhaust gas formed by such combustion is greatly reduced.

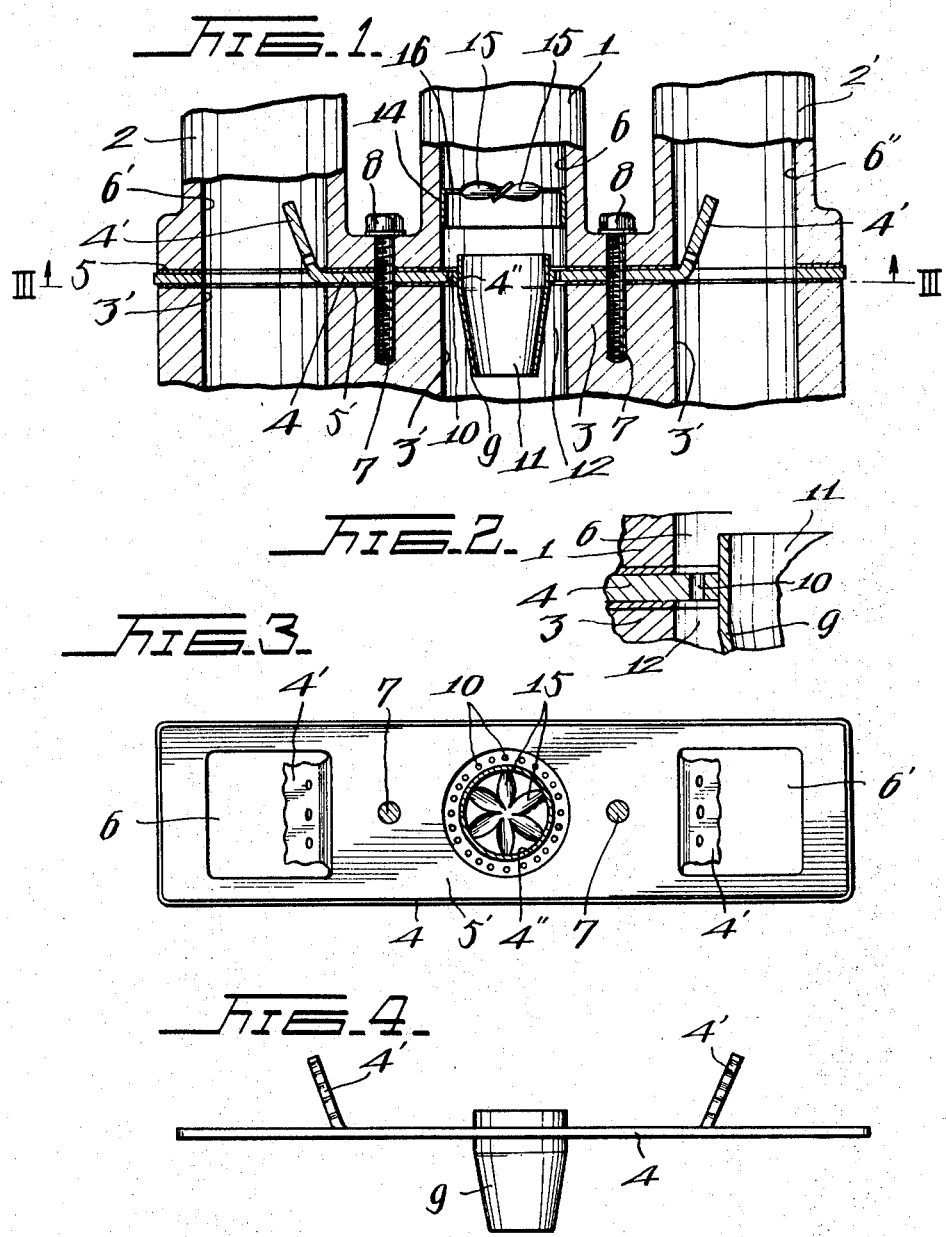

Patented Sept. 29, 1970

INVENTOR:
Mitsuji Kawai
BY:
Hamill, Downing & Seebold
ATTORNEYS

DEVICE ADAPTED TO BE EMPLOYED IN CONJUNCTION WITH THE CARBURETOR IN AN INTERNAL COMBUSTION ENGINE

BACKGROUND OF THE INVENTION

In the conventional internal combustion engines, the vaporized mixture of fuel and air to be burned in the engine was directly introduced from the carburetor which had formed and vaporized the mixture through the intake passage to the cylinder without being subjected to further vaporization treatment and such conventional internal combustion engines have the disadvantages that the mixture would not be perfectly burned and therefore, the exhaust gas formed by the combustion of such fuel mixture usually contained a great amount of hydrocarbon therein and such engines are not perfectly satisfactory with respect to the engine efficiency, fuel consumption and public hygiene.

SUMMARY OF THE INVENTION

The present invention relates to a device adapted to be employed in conjunction with the carburetor in an automobile internal combustion engine, for example, for heating and reducing the pressure on a mixture flow of fuel and air from said carburetor as well as perfect vaporization of the mixture while the mixture flow is being conducted toward the cylinder of the engine.

One object of the present invention is to provide a vaporization acceleration device adapted to be employed in conjunction with the carburetor in an internal combustion engine in which a mixture flow of fuel and air from said carburetor which has formed and vaporized the mixture flow is further subjected to additional vaporization treatment while the mixture flow is moving from the carburetor toward the cylinder of the engine whereby the mixture is perfectly vaporized and heated sufficient for perfect combustion in the cylinder and the amount of hydrocarbon to be contained in the exhaust gas formed from the combustion of the mixture is reduced to a minumum level.

A further object of the present invention is to provide a novel and improved vaporization acceleration device which can effectively eliminate the above-mentioned disadvantages inherent in the conventional internal combustion engines.

According to the present invention, there is provided a device for the heating, pressure-reduction and vaporization of a gaseous mixture in an internal combustion engine, comprising gaseous mixture intake passage means for communicating between the outlet of a carburetor and the inlet of a cylinder; exhaust gas passage means in communication with the outlets of said cylinder; a common high heat conductive heat absorption plate unit for cooperation with said intake and exhaust gas passage means and having integral heat absorption acceleration means which are disposed within said gas exhaust passage means for acceleration of transfer of the heat from said mixture to said heat absorption plate unit while the exhaust gas formed by the combustion of said mixture is passing through said exhaust gas passage means, said heat absorption plate having a center opening in communication with said intake passage means; a funnel-shaped cylindrical member received in said heat absorption plate unit opening and depending from the plate unit, said cylindrical member being adapted to have transferred thereto the heat from said heat absorption plate unit; said heat absorption plate unit further having a plurality of small holes formed around and spaced from said funnel-shaped cylindrical member and in communication with said intake passage means; and annular pressure reduction passage means defined by the outer peripheral surface of said funnel-shaped cylindrical member and the walls of said intake passage means in communication with said plurality of small holes in the heat absorption plate unit whereby the gaseous mixture is heated to a high temperature and perfectly vaporized and at the same time the pressure on the mixture is reduced while the mixture is passing through the annular pressure reduction passage means.

The above and other objects and advantages of the present invention will be more readily apparent to those skilled in the art from a reading of the following description in conjuction with the accompanying drawings.

BRIEF DESCRIPTION OF THE DRAWINGS

FIG. 1 is a fragmentary longitudinal cross-sectional view of one preferred form of device for heating, pressure-reducing and vaporizing a gaseous mixture to be fed to an internal combustion engine according to the present invention;

FIG. 2 is an enlarged cross-sectional view of portion of said device especially showing the annular pressure reduction passage defined by the walls of an opening in a gas absorption vessel and the outer peripheral surface of a funnel-shaped cylindrical member with the upper portion removed therefrom;

FIG. 3 is a view taken along line III–III in FIG. 1 the view looking in the direction of the arrows;

FIG. 4 is a fragmentary side elevational view showing exclusively the heat absorption plate unit and funnel-shaped cylindrical member shown in FIG. 1;

PREFERRED EMBODIMENTS OF THE INVENTION

Figure 5:
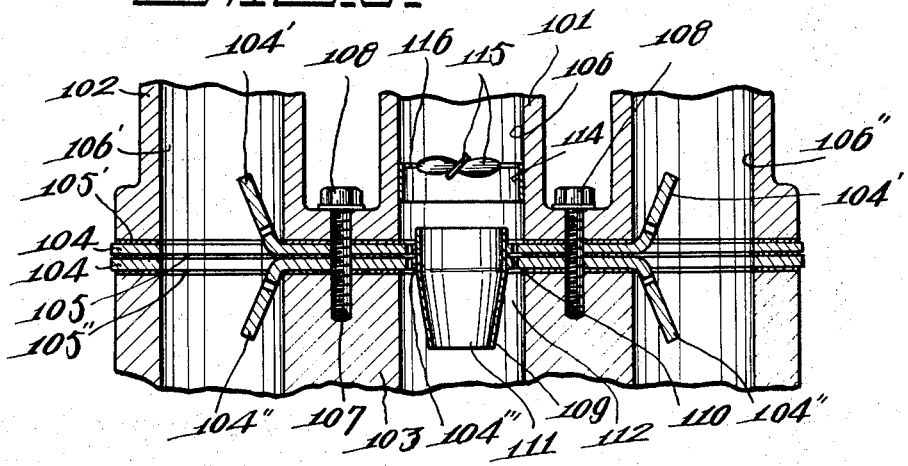
FIG. 5 is a fragmentary longitudinal cross-sectional view of a modified form of device according to the present invention in which two heat absorption plates are employed.

The invention will be now in detail described referring to the accompanying drawings and especially to FIGS. 1 to 4 inclusive wherein a first embodiment of a device for heating, pressure-reducing and vaporizing a gaseous mixture constructed in accordance with the present invention is shown. For illustration purpose, the novel device will be described as being employed in conjunction with the carburetor which is adapted to carburet a mixture of fuel and air to be fed to the cylinder of an automobile internal combustion engine. The device generally comprises a gaseous mixture intake pipe 1 at one end connected to the inlet of a carburetor (not shown) for receiving a gaseous mixture comprising fuel and air under a high pressure from the latter and also connected at the other end to the inlet of a cylinder (not shown) for feeding the mixture to the latter after perfect vaporization of the mixture. A pair of exhaust gas pipes 2 and 2' are disposed on the opposite sides of the intake pipe 1 and connected to the outlets of the cylinder for receiving exhaust gas from the latter and discharge the gas out of the system. The upper portions of the intake pipe 1 and exhaust gas pipes 2 and 2' are arranged in a spaced relation to one another in the longitudinal direction of the device and the lower portions of these pipes are integrally formed. A gas absorption vessel 3 extends longitudinally beneath the intake pipe 1 and exhaust gas pipes 2 and 2' and has three openings 3' which are respectively in communication with the interior of these pipes for the purpose to be described hereinafter. An elongated heat absorption plate 4 which is formed of a high heat conductive material such as copper is disposed between the lower ends of the intake and exhaust pipes 1, 2 and 2' and the top of the gas absorption vessel 3. The heat absorption plate 4 is sandwiched in between an upper gasket 5 and a lower gasket 5' which are disposed between the lower ends of the pipes 1, 2 and 2' and the top of the plate 4 and between the bottom of the plate and the top of the vessel 3 respectively. These upper and lower gaskets 5 and 5' also have openings (not shown) which communicate between the interior of the respectively corresponding pipes and the three openings 3' in the gas absorption vessel 3. The elongated heat absorption plate 4 is bent upwardly at the opposite ends at an angle greater than 90° as shown by reference numeral 4' in FIGS. 1, 3 and 4. The bent ends 4' of the heat absorption plate 4 extend into the exhaust gas pipes 2 and 2' as more clearly shown in FIG. 1 and serve as heat absorption acceleration means as will be described hereinafter. The elongated heat absorption plate 4 has a circular opening 4'' formed in the center for the purpose to be described hereinafter. The intake pipe 1 and the corresponding center opening 3' in the gas absorption vessel 3 define a gaseous mixture intake passage 6 and in the same manner the exhaust gas pipes 2 and 2' cooperate with the respectively corresponding left and right openings 3' in the vessel 3 (as seen in FIG. 1) in defining exhaust gas passages 6' and 6''.

The intake pipe 1, exhaust gas pipes 2 and 2', gas absorption vessel 3, heat absorption plate 4 and upper and lower gaskets 5 and 5' are secured together by suitable fastening means such as bolts 7 and nuts 8 as shown in FIG. 1. The center opening 4'' in the heat absorption plate 4 receives a funnel-shaped pressure-reduction passage forming cylindrical member 9 which is reduced in diameter toward the lower end and the upper end of the cylindrical member projects slightly above the plane of the upper gasket 5 into the intake passage 6. The cylindrical member 9 is welded to the peripheral edge of the center opening 4'' in the heat absorption plate 4. The heat absorption plate 4 is further provided with a plurality of equally angular spaced small holes 10 around and spaced from the funnel-shaped cylindrical member 9 and in communication with the intake passage 6. A substantial portion of the funnel-shaped cylindrical member 9 which extends into the center opening 3' in the vessel 3 divides the lower portion of the intake passage 6 into a circular lighter fuel component passage 11 defined by the inner wall of the cylindrical member 9 and an annular heavier fuel component or pressure reduction passage 12 defined by the walls of the center opening 3' in the vessel 3 and the outer periphery of the cylindrical member 9. As mentioned above, since the cylindrical member is of funnel shape and reduced in diameter toward the lower end, the lighter fuel component passage 11 reduces its cross section area toward the lower end while the heavier fuel component passage or pressure reduction passage 12 increases its cross section area toward the lower end. As seen in FIG. 1, the lower ends of these passages 11 and 12 terminate short of the cylinder of the engine (not shown) so that the lighter fuel components and heavier fuel components may merge into a single flow after both the fuel components have cleared the lower end of the cylindrical member 9. A ring member 14 is snugly fit in the upper portion of the intake passage 6 or in the intake pipe 1 in a position above and spaced from the projected upper end of the funnel-shaped cylindrical member 9 where the temperature of the gaseous fuel mixture is highest and the ring fixedly supports a centrifugal blade assembly comprising a plurality of radially arranged blades 15 at the upper end by means of a support piece 16 which horizontally extends at the upper end of the ring 14 across the diameter of the intake passage 6. The radially disposed blades 15 are twisted and the outer ends of the thus disposed blades define an imaginary circle having substantially the same diameter as that of the projected upper end of the funnel-shaped cylindrical member 9.

In operation, a flow of gaseous mixture comprising fuel and air from the carburetor which has mixed and carburetted the fuel and air is forced into the gaseous mixture intake passage 6 under a high pressure so as to impinge against the centrifugal blade assembly 15 which in turn separates the mixture into a flow of the lighter of the smaller particle components of the mixture and another flow of the heavier or larger particle components of the mixture by its centrifugal action. The flow of the lighter components is caused to enter and pass through the circular lighter component passage 11 defined by the inner periphery of the funnel-shaped cylindrical member 9 while the flow of heavier components is caused to pass through the small holes 10 in the heat absorption plate 4 into the annular heavier component passage 12 defined by the walls of the lower intake passage portion and the outer periphery of the cylindrical member 9. As mentioned above, since the circular passage 11 decreases its cross section area toward the lower end the velocity of the lighter component flow increases as the flow moves down along the passage 12 and on the other hand the velocity of the heavier component flow decreases and the pressure on the same is reduced by expanding as the flow moves down along the annular passage 12 because the cross section area of the annular passage increases toward the lower end. In the manner mentioned above, the velocity of the lighter component flow will have become substantially the same as that of the heavier component flow and the particle size of the heavier components will have been reduced to substantially equal to that of the lighter components until the two flows merge into a single mixture flow at or in the vicinity of the lower end of the cylindrical member 9. The thus merged single mixture flow is then fed to the engine cylinder to operate the same. As mentioned above, since the heat absorption acceleration ends 4' of the heat absorption plate 4 are disposed in the exhaust gas passages 6' and 6'', the plate absorbs the heat of the exhaust gas flows which have been discharged from the engine (not shown) and are rising up the exhaust gas passages to be discharged out of the system and therefore, the heat absorption plate 4 is maintained at an elevated temperature. The high temperature heat absorption plate 4 then transfers its heat to the succeeding lighter component flow as the flow passes through the circular passage 11 within the cylindrical member 9 and at the same time also transfers its heat to the succeeding heavier component flow as the flow passes through the annular passage 12 and perfectly vaporizes the heavier component flow. As mentioned above, since the annular passage 12 increases its cross section area toward the lower end, as the heavier component flow passes through the passage 12 the flow is caused to expand to reduce the pressure thereon as well as the heating and vaporization thereof and therefore, when the thus treated heavier component flow is merged with the lighter component flow at or in the vicinity of the lower end of the funnel-shaped cylindrical member 9, the two flows provide a perfectly vaporized and uniformly heated fuel flow having a low boiling point which is ready to be introduced into the cylinder for operation of the engine. Thus, it will be understood that if the novel device is employed in an internal combustion engine in conjuction with the carburetor, the exhaust gas formed by the combustion of the fuel will contain a very small hydrocarbon therein.

It should be understood that although the heat transferring function by the heat absorption plate 4 is not realized at the start of the operation because no exhaust gas is present in the exhaust gas passages 6 and 6' at such a time, the period during which the exhaust gas is not present in the exhaust passages is very short.

Turning now to FIG. 5 of the accompanying drawings wherein a modified form of device for heating, pressure-reducing and vaporizing a gaseous mixture according to the present invention is shown, in this modified embodiment two elongated heat absorption plates 104 formed of a high heat conductive material such as copper and having a plurality of small holes 110 identical with the holes in the heat absorption plate 4 are employed instead of the single heat absorption plate 4 in the first embodiment. The two heat absorption plates 104 are superimposed one on the other with a gasket 105 interposed therebetween. As in the case of the first embodiment, the two heat absorption plates 104 are sandwiched in between an upper gasket 105' and a lower gasket 105'' and disposed between the lower ends of the fuel mixture intake pipe 101, exhaust pipes 102 and 102' and the top of the gas absorption vessel 103. The construction and arrangement of the intake pipe 101, exhaust pipes 102, 102', vessel 103 and gaskets 105, 105', 105'' are the same as those of the corresponding parts of the first embodiment and further description of these parts will be omitted herein. In this modified embodiment, the upper heat absorption plate is bent upwardly at an angle greater than 90° at the opposite ends as shown by reference numerals 104' and the bent ends extend into the upper portions of the exhaust gas passages 106 and 106' defined by the exhaust pipes 102 and 102' respectively. On the other hand, the lower heat absorption plate is bent downwardly at an angle greater than 90° at the opposite ends as shown by reference numeral 104'' and the bent ends extend into the lower portions of the exhaust gas passages 106 and 106' respectively. The pipes 101, 102, 102', vessel 3, plates 104 and gaskets 105, 105', 105'' are secured together by means of suitable fastening means such as bolts 107 and nuts 108 in the same manner as in the first embodiment. The construction and arrangement of the remaining parts of this modified embodiment are the same as those of the corresponding parts of the first embodiment and further description of these parts will be omitted herein. Since the modified embodiment employs two heat absorption plates, the heat absorption efficiency of this embodiment is higher than that of the first embodiment.

Figure 6:
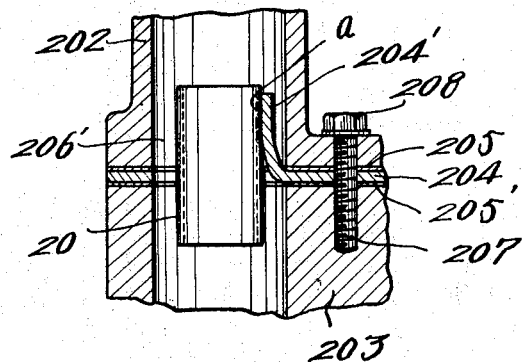
FIG. 6 is a fragmentary longitudinal cross-section view of a further modified form of device according to the present invention in which heat absorption acceleration pipes are brazed to the opposite ends of the heat absorption plate.

FIG. 6 of the accompanying drawings shows a further modified form of device for heating, pressure-reducing and vaporizing a gaseous mixture according to the present invention. In this embodiment, a cylindrical member 20 formed of the same material as that of which the heat absorption plates 4 and 104 are formed is disposed in each of the upper portions of the exhaust gas passages 206' and brazed to each of the heat absorption plate ends 204' at a (only each one of the cylindrical member and plate end are shown) and these cylindrical members serve as additional heat absorption acceleration means. Thus, the heat absorption efficiency of this modified device of FIG. 6 is higher than that of any of the foregoing two embodiments. The construction and arrangement of the remaining parts of this embodiment are the same as those of the preceding embodiments and further description of these parts will be omitted herein.

I have previously proposed a switch device adapted to be employed in an internal combustion engine for the same purpose for which the present invention was made and the switch device is disclosed in U.S. Pat. No. 3,300,742. The provision of such a switch device in the internal combustion engine succeeded in an attainment of a theoretical air-fuel ratio (by weight) as high as 15:1, which had been regarded as impossible.

By the use of the switch device in the internal combustion engine it was made possible to reduce the amount of carbon monoxide to be formed from the combustion of fuel to a very low level such as 0.15 percent to 1 percent by weight of the total fuel, but on the other hand the amount of hydrocarbon to be contained in the exhaust gas increased to a great level.

However, the novel device was used in combination with the switch device as disclosed in the above-mentioned U.S. patent in the internal combustion engine of an automobile and experiments were conducted on the operative efficiency of the combination use at various driving velocities of the automobile. The following are the results of the experiments.

| Velocity of automobile per hour, km. | Amount of carbon fuel (CO), percent | Amount of hydrocarbon (HC), p.p.m. |
| --- | --- | --- |
| 10 | 0.15 | 260 |
| 20 | 0.1 | 270 |
| 30 | 0.1 | 260 |
| 40 | 0.1 | 230 |
| 50 | 0.1 | 160 |
| 60 | 0.1 | 150 |
| 70 | 0.1 | 140 |

Since there is the possibility of breakage of the dynamo meter at velocities of the automobile in excess of 70 km per hour, no experiment was conducted at such high driving velocities.

The above experiments have also shown that when an automobile is driven at velocities at which the automobile is generally allowed to be driven along urban districts, no foreign matter adheres to the inner walls of the exhaust pipes.

Such satisfactory phenomenon has never been experienced in any of the conventional devices similar to the device of the present invention as far as I know. And it has been found that when the velocity of an automobile equipped with any of the novel devices mentioned above and using one of the standard gasolines exceeds 100 km per hour, the inner walls of the exhaust pipes would become white. The whitening of the exhaust pipe walls is due to the oxidization of the lead contained in the gasoline. When cylindrical additional heat absorption acceleration members having a diameter of 25 mm and a length of 50 mm identical with that as shown in FIG. 6 by reference numeral 20 are brazed to the opposite ends of the heat absorption plate in order to augment the heat absorption efficiency of the heat absorption plate and the automobile equipped with the device of FIG. 6 is driven at the velocity of 60 km per hour, the inner walls of the exhaust pipes would be whitened. This means that the fuel was perfectly burned in the automobile engine.

Furthermore, it has been found that in an automobile equipped with any of the novel devices the higher the car driving velocity, the softer the sound of the engine. This is due to the fact that the cooling effect of the air contained in the fuel is increased in direct proportion to the increase in the driving velocity of the automobile and this in turn functions to reduce the air compression heat in the cylinder and therefore, attains reduction in the consumption amount of fuel. For example, when an automobile having a cylinder capacity of 1,500 cc and equipped with any of the novel devices is driven at a velocity on the order of 120 km per hour, the automobile can be driven a distance of 12 km with the consumption of only 1 liter of gasoline. Furthermore, the engine of an automobile equipped with any of the novel devices can be easily started even during cold weather. Such easy starting of the engine during cold weather is due to the fact that the pressure on the fuel is reduced and fuel is perfectly vaporized. Even if the gasoline in the amount of about 50 cc is contained within the cylinder at the start of the engine in excess of 40 cc which is the maximum amount conventionally allowable within the cylinder at the start of the engine, such a great amount of fuel can be promptly vaporized.

Thus, the novel devices are superior to my earlier fuel vaporization acceleration device for an internal combustion engine as disclosed in my Japanese Utility Model Reg. No. 556,760 with respect to vaporization efficiency and perfect combustion of fuel. Especially, the novel devices make it possible to greatly reduce the hydrocarbon content in the exhaust gas and to enable any standard gasoline to operate the engine with a far improved efficiency than that obtainable by the use of a high octane gasoline. Thus, the present invention is very useful for attainment of higher automobile driving velocities and public hygiene.

Although certain preferred embodiments of the invention have been described and illustrated herein, it is to be understood that these are illustrative in nature and not necessarily limiting the scope of these teachings in their broader aspects. Many additional variations within the scope of the appended claims will doubtless occur to those skilled in the art.

I claim:

1. A device for the heating, pressure-reduction and vaporization of a gaseous mixture in an internal combustion engine, comprising gaseous mixture intake passage means for communicating between the outlet of a carburetor and the inlet of a cylinder; exhaust gas passage means in communication with the outlets of said cylinder; a common high heat conductive heat absorption plate unit for cooperation with said intake and exhaust gas passage means and having integral heat absorption acceleration means which are disposed within said gas exhaust gas passage means for acceleration of transfer of the heat from said mixture to said heat absorption plate unit while the exhaust gas formed by the combustion of said mixture is passing through said exhaust gas passage means, said heat absorption plate unit having a center opening in communication with said intake passage means; a funnel-shaped cylindrical member received in said heat absorption plate unit opening and depending from the plate unit, said cylindrical member being adapted to have transferred thereto the heat from said heat absorption plate unit; said heat absorption plate unit further having a plurality of small holes formed around and spaced from said funnel-shaped cylindrical member and in communication with said intake passage means; and annular pressure reduction passage means defined by the outer periphery of said cylindrical member and the walls of said intake passage means in communication with said plurality of small holes in the heat absorption plate unit whereby the gaseous mixture is heated to a high temperature and perfectly vaporized and at the same time the pressure on the mixture is reduced while the mixture is passing though the annular pressure-reduction passage means.

2. The device for the heating, pressure-reduction and vaporization of a gaseous mixture in an internal combustion engine as set forth in claim 1, in which said gaseous mixture intake passage means comprises an intake pipe and an opening formed in a gas absorption vessel disposed beneath said intake pipe and in communication with the inlet of said cylinder and said exhaust gas passage means comprises a pair of exhaust pipes disposed on the opposite sides of said intake pipe and additional openings formed in said vessel in communication with the outlets of said cylinder.

3. The device for the heating, pressure-reduction and vaporization of a gaseous mixture in an internal combustion engine as set forth in claim 2, in which said heat absorption plate unit comprises a copper plate sandwiched between an upper gasket and a lower gasket which are disposed between said intake and exhaust gas pipes and said vessel and said plate has the opposite ends bent upwardly and extending into said exhaust gas pipes.

4. The device for the heating, pressure-reduction and vaporization of a gaseous mixture in an internal combustion engine as set forth in claim 2, in which said heat absorption plate unit comprises two copper plates superposed one on the other with a gasket interposed therebetween and sandwiched between an upper gasket and a lower gasket which are disposed between said intake and exhaust gas pipes and said vessel and the upper one of said copper plates has the opposite ends bent upwardly and extending into said exhaust pipes while the lower copper plate has the opposite ends bent downwardly and extending into said additional openings in the vessel.

5. The device for the heating, pressure-reduction and vaporization of a gaseous mixture in an internal combustion engine as set forth in claim 2, in which said intake and exhaust gas pipes, vessel and heat absorption plate unit are secured together by means of fastening means.

6. The device for the heating, pressure-reduction and vaporization of a gaseous mixture in an internal combustion engine as set forth in claim 3, in which said copper plate further has copper cylindrical members brazed to the upwardly bent opposite ends and disposed in said exhaust pipes.

7. The device for the heating, pressure-reduction and vaporization of a gaseous mixture in an internal combustion engine as set forth in claim 3, in which said copper plate has a plurality of equally angular spaced small holes disposed around and spaced from said funnel-shaped cylindrical member and in communication with said intake passage means and said upper and lower gaskets have openings in communication with said intake and exhaust gas passage means.

8. The device for the heating, pressure-reduction and vaporization of a gaseous mixture in an internal combustion engine as set forth in claim 4, in which said copper plates have a plurality of equally angular spaced small aligned holes respectively in communication with said intake passage means and said upper, lower and interposed gaskets have openings in communication with said intake and exhaust gas passage means.

9. The device for the heating, pressure-reduction and vaporization of a gaseous mixture in an internal combustion engine as set forth in claim 1, in which said device further includes a stationary twisted radially arranged blade assembly disposed in said intake passage means on the upper stream of said funnel-shaped cylindrical member.

10. The device for the heating, pressure-reduction and vaporization of a gaseous mixture in an internal combustion engine as set forth in claim 2, in which said funnel-shaped cylindrical member is welded to said heat absorption plate unit with the upper end slightly projecting above the plane of the unit and a substantial portion of the funnel-shaped cylindrical member extending into the opening in said vessel which is in communication with said intake pipe.